US012167792B2

(12) United States Patent
Tingle et al.

(10) Patent No.: US 12,167,792 B2
(45) Date of Patent: Dec. 17, 2024

(54) REVOLVING SHELF MULTI-SHELF CABINET STORAGE SYSTEM

(71) Applicant: Rev-A-Shelf Company, LLC, Louisville, KY (US)

(72) Inventors: Bryan Keith Tingle, Shelbyville, KY (US); Paul Franklin Chambers, Louisville, KY (US); David P. Noe, Louisville, KY (US)

(73) Assignee: REV-A-SHELF COMPANY, LLC, Louisville, KY (US)

( * ) Notice: Subject to any disclaimer, the term of this patent is extended or adjusted under 35 U.S.C. 154(b) by 0 days.

(21) Appl. No.: 18/165,134

(22) Filed: Feb. 6, 2023

(65) Prior Publication Data

US 2024/0260753 A1 Aug. 8, 2024

(51) Int. Cl.

| | |
|---|---|
| ***A47B 88/60*** | (2017.01) |
| ***A47B 46/00*** | (2006.01) |
| ***A47B 51/00*** | (2006.01) |
| ***A47B 88/407*** | (2017.01) |
| ***A47B 88/42*** | (2017.01) |
| ***E05C 3/14*** | (2006.01) |

(52) U.S. Cl.
CPC .............. *A47B 88/60* (2017.01); *A47B 46/00* (2013.01); *A47B 51/00* (2013.01); *A47B 88/407* (2017.01); *A47B 88/42* (2017.01); *E05C 3/14* (2013.01); *A47B 2220/0011* (2013.01)

(58) Field of Classification Search
CPC ..... A47B 46/00; A47B 88/42; A47B 88/0485; A47B 88/48; A47B 88/06; A47B 88/60; A47B 88/18; A47B 2088/422; A47B 2088/0492; A47B 96/025; A47B 2220/0011; A47B 51/00; A47B 88/407; A47B 88/0407; E05C 3/14
See application file for complete search history.

(56) References Cited

U.S. PATENT DOCUMENTS

| | | | | |
|---|---|---|---|---|
| 10,799,020 B1 * | 10/2020 | Tingle | .................... | A47B 46/00 |
| 2012/0049713 A1 * | 3/2012 | Tingle | .................... | A47B 88/42<br>312/334.33 |
| 2013/0207529 A1 * | 8/2013 | Kearsey | ................. | A47B 46/00<br>188/296 |

(Continued)

FOREIGN PATENT DOCUMENTS

| | | | | |
|---|---|---|---|---|
| AT | 503010 B1 * | 7/2007 | ............. | A47B 88/42 |
| CN | 111602968 A * | 9/2020 | ............. | A47B 46/00 |

(Continued)

*Primary Examiner* — Andrew Roersma
(74) *Attorney, Agent, or Firm* — Crowell & Moring LLP

(57) ABSTRACT

A cabinet storage system includes a front vertical member, a rear vertical member and planar horizontal members coupled with the front vertical member and the rear vertical member and extending therebetween to form a multi-shelf storage container. The system also including a slide coupled with the multi-shelf storage container, the multi-shelf storage container slideable out of a cabinet carcass in which the multi-shelf storage container is mounted. The system also includes a swivel. The swivel including a base and a rotatable table. The base fixedly coupled with a planar surface of one of the planar horizontal members, and a horizontal shelf fixedly coupled with the rotatable table in a plane parallel with the one of the planar horizontal members.

20 Claims, 8 Drawing Sheets

(56) References Cited

U.S. PATENT DOCUMENTS

| | | | | |
|---|---|---|---|---|
| 2017/0332785 | A1* | 11/2017 | Chen | A47B 88/43 |
| 2022/0142364 | A1* | 5/2022 | Held | A47B 88/497 |
| 2022/0378202 | A1* | 12/2022 | Storck | A47B 88/42 |

FOREIGN PATENT DOCUMENTS

| | | | | |
|---|---|---|---|---|
| DE | 202005016432 | U1 * | 1/2006 | A47B 46/00 |
| DE | 202005001998 | U1 * | 7/2006 | A47B 88/0485 |
| DE | 202004021512 | U1 * | 10/2008 | A47B 88/0485 |
| DE | 202018103969 | U1 * | 9/2018 | |
| EP | 1842453 | A1 * | 10/2007 | A47B 46/00 |
| EP | 1972229 | A1 * | 9/2008 | A47B 88/42 |
| EP | 2078473 | A1 * | 7/2009 | A47B 88/06 |

* cited by examiner

REVOLVING SHELF MULTI-SHELF CABINET STORAGE SYSTEM

FIELD

The present disclosure relates generally to a multi-level cabinet storage system for use in a cabinet or other enclosure and more particularly to a revolving shelf multi-level cabinet storage system with one or more revolving shelves.

BACKGROUND

Cabinets such as storage cabinets for kitchens, bathrooms, closets, offices and other uses can include one or more receptacles, such as drawers or shelves for storing articles. The drawers and shelves can move in and out of the cabinet between an open position and a closed position. While in the open position, a drawer or shelf may be extended away from the storage cabinet or other enclosure so as to receive the articles. In the closed position, the drawer or shelf may be recessed within the storage cabinet or other enclosure in which the drawer or shelve is installed. The size and weight of such drawers or shelves can vary. In addition, the weight and/or number of articles that can be stored on the drawers or shelves can be quite different in different applications.

SUMMARY

Further areas of applicability will become apparent from the description provided herein. It should be understood that the description and specific examples are intended for purposes of illustration only and are not intended to limit the scope of the present disclosure.

A cabinet storage system may include a multi-shelf storage container having horizontal planer members positioned horizontally between, and perpendicular to, a front vertical planar member and a rear vertical planar member. Slides may be coupled with the multi-shelf storage container, and configured to couple with a cabinet carcass in which the multi-shelf storage container is mountable. At least some of the horizontal planar members may include shelves. A swivel may be coupled with one of the horizontal planar members and one of the shelves so that the shelf rotates, or revolves, horizontally with respect to the horizontal planar member.

An interesting feature of the cabinet storage system relates to the horizontal planar member and the shelf being positioned in parallel planes with the swivel positioned therebetween.

Another interesting feature of the cabinet storage system relates to the swivel, which includes a base coupled with the horizontal planar member, and a rotatable table coupled with a planar surface of the shelf. The base and the rotatable table are on opposing sides of the swivel, and the rotatable table is rotatable with respect to the base.

Yet another interesting feature of the cabinet storage system relates to the horizontal planar member including an aperture sized to receive a portion of the base that extends into the aperture such that the vertical distance between the horizontal planar member and the shelf is minimized.

Still another interesting feature of the cabinet storage system relates to the swivel including a bias coupled between the base and the rotatable table to rotatably return the shelf to a rest position where the shelf is aligned in parallel with the horizontal planar member.

Another interesting feature of the cabinet storage system relates to the swivel including a rotary damper coupled with the base to slow inertial rotational acceleration of the shelf when the shelf rotatably returns to, or is rotated out of the rest position.

Other systems, methods, features and advantages will be, or will become, apparent to one with skill in the art upon examination of the following figures and detailed description. It is intended that all such additional systems, methods, features and advantages be included within this description, be within the scope of the invention, and the following claims.

BRIEF DESCRIPTION OF DRAWINGS

The system may be better understood with reference to the following drawings and description. The components in the figures are not necessarily to scale, emphasis instead being placed upon illustrating the principles of the invention. Moreover, in the figures, like referenced numerals designate corresponding parts throughout the different views.

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
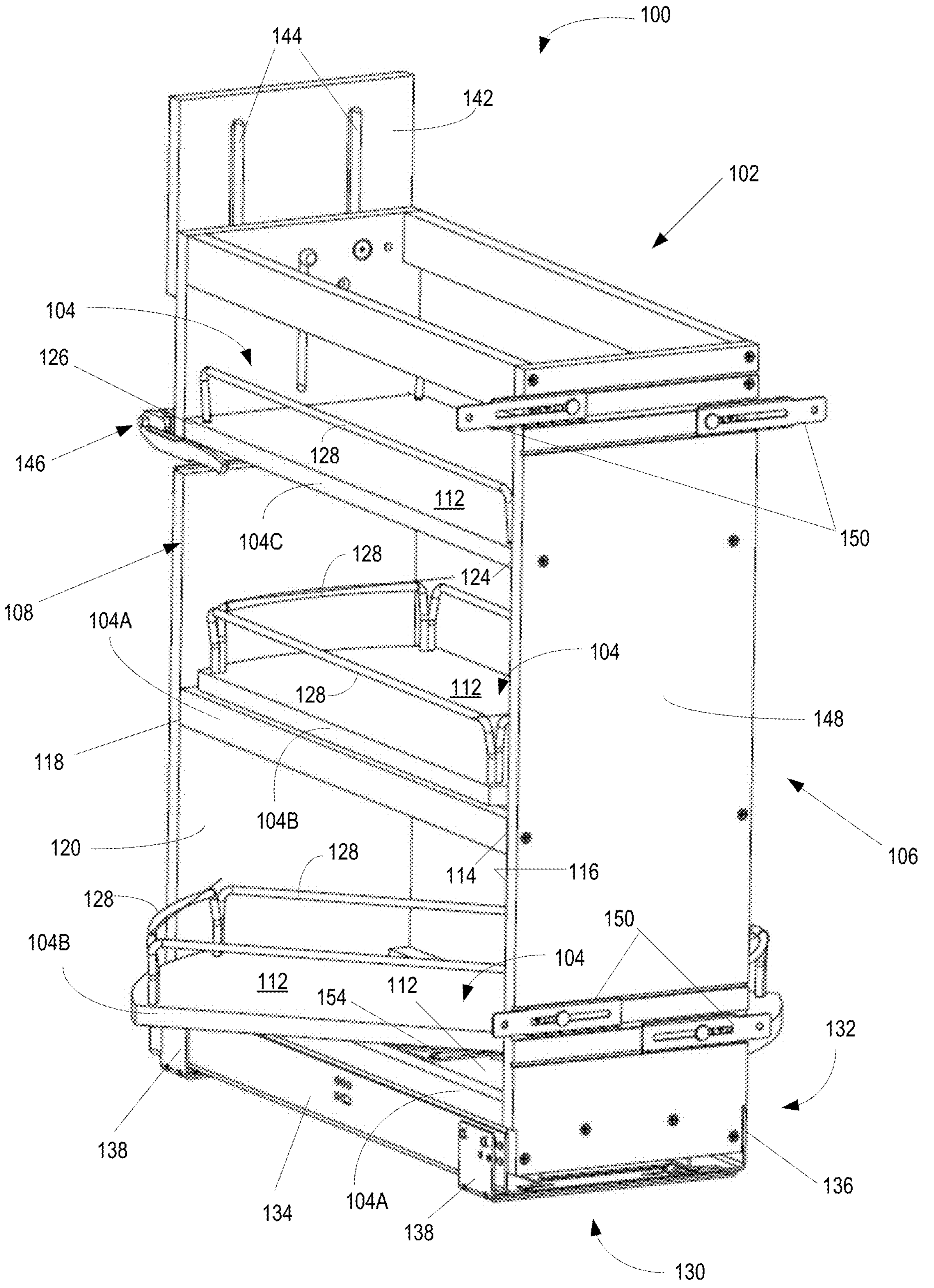
FIG. 1 is a perspective view of an example multi-level cabinet storage system.

FIG. 1 is a perspective view of an example multi-level cabinet storage system 100. The multi-level cabinet storage system 100 includes a multi-level storage container 102. The multi-level storage container 102 includes multiple horizontal planar members 104, a front or first vertical member 106 and a rear or second vertical member 108. The vertical members 106 and 108 are opposing vertical members. Each of the horizontal planar members 104 are positioned horizontally between the vertical members 106 and 108 such that opposing horizontal planar surfaces 112 of the horizontal planar members 104 are arranged in a horizontal plane perpendicular to a vertical plane in which the respective vertical members 106 and 108 reside. Thus, the horizontal planar members 104 may be transversely aligned with vertical planes defined by the front and rear vertical members 106 and 108.

The horizontal planar members 104 and front and rear vertical members 106 and 108 may be made of wood, metal, plastic, composite, and/or any other rigid material. In an example, the horizontal planar members 104 and front and rear vertical members 106 and 108 are made of wood. In another example, the horizontal planar members 104 are made of metal, such as in the form of wire, and the front and rear vertical members 106 and 108 are made of wood or plastic. In other examples, other configurations of rigid materials may be used. Some of the horizontal planar members 104 in the multi-level cabinet system are shelves upon which articles may be stored. Others of the horizontal members 104 are a structural base to which a horizontal planar members 104 operable as a respective shelf is mounted.

For example, as illustrated in FIG. 1, the bottom and middle positioned horizontal planar members 104 include a structural base horizontal planar member 104A and shelf horizontal planar member 104B, which are separate and distinct horizontal planar members 104 positioned in parallel planes represented by the respective planar surfaces. The structural base horizontal planar member 104A is fixedly coupled at a first end 114 with a front wall 116 of the front vertical member 106, and at a second opposite end 118 with a rear wall 120 of the rear vertical member 108. As illustrated in FIG. 1, the shelf horizontal members 104B are not coupled with the front and rear vertical member 106 and 108. Instead, the shelf horizontal members 104B are rotatably coupled with a respective structural base horizontal planar member 104A. Thus, the shelf horizontal members 104B may be rotatably positioned in parallel alignment with the structural base horizontal planar member 104A as illustrated by the middle shelf horizontal members 104B in FIG. 1. Alternatively, the shelf horizontal members 104B may be rotated, or revolved, to be obliquely aligned with the structural base horizontal planar member 104A as illustrated by the bottom shelf horizontal planar member 104B in FIG. 1.

In the example of FIG. 1, a fixed shelf horizontal member 104C is fixedly coupled at a first end 124 with the wall 116 on the front vertical member 106 and with the wall 120 of the rear vertical member 108 at an opposing second end 126 as an upper positioned horizontal planar member 104. In other examples, rotatable and fixed horizontal planar members 104 may be in different configurations, locations, and different quantities, to create any configuration of fixed shelf horizontal members 104C and/or pairs of rotatable shelf horizontal members 104B rotatably coupled with structural base horizontal planar member 104A. Those horizontal planar members 104 that are fixed or rotatable shelves may include rails 128 positioned on lateral opposing sides of the horizontal planar members 104. The rails 128 may be any rigid material, such as metal. The rails 128 may be mounted on the horizontal planar surface 112 of fixed or rotatable shelves and extend transverse to the horizontal planar surface 112.

The multi-level storage system 100 also includes at least two slides 130, which may be positioned on opposing sides of a base 132 of the multi-level storage container 102. The slides 130 may include a first slide 134 and a second slide 136 coupled with each other and/or the multi-level storage container 102. Each of the slides 130 may include a slidable portion coupled with a base of the multi-level storage container 102, and a fixed portion. The slides 130 may also include a mounting bracket 138 coupled with the fixed portion of the first and second slides 134 and 136 and/or the multi-level storage container 102. In the illustrated example, front and rear mounting brackets 138 are illustrated. In other examples, other number of mounting brackets may be coupled between the slides 130. The mounting bracket 138 may be used to mount the multi-level storage system 100 in a cabinet. Alternatively, the first and second slides 134 and 136 may be used to mount the multi-level storage system 100 in the cabinet, and the mounting bracket(s) 138 may be omitted.

Figure 2:
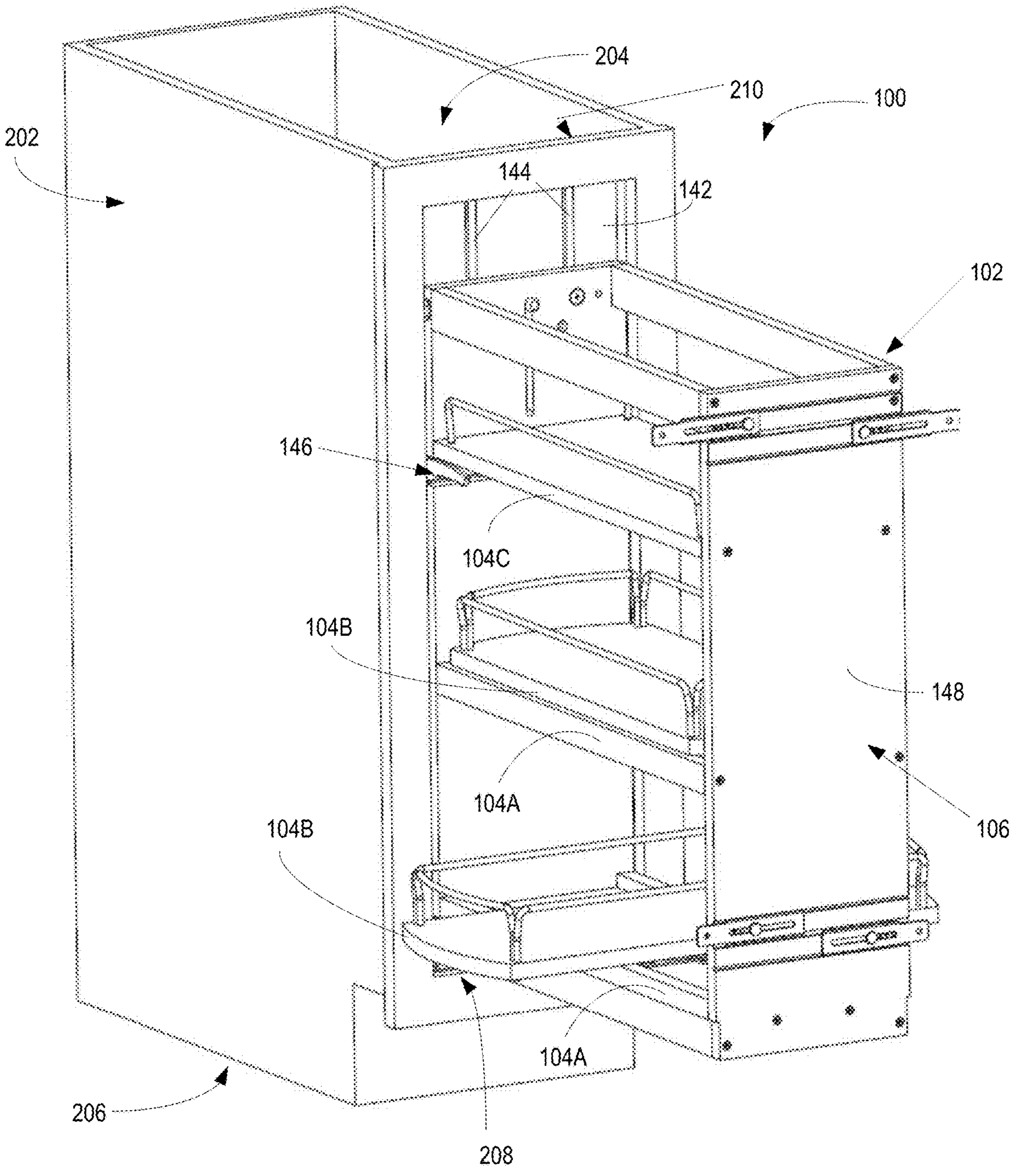
FIG. 2 is a perspective view of an example multi-level cabinet storage system mounted in a cabinet or cabinet carcass.

FIG. 2 is a perspective view of an example multi-level storage system 100 mounted in a cabinet 202 or cabinet carcass. Referring to FIGS. 1 and 2, the multi-level storage system 100 may be mounted inside a cavity 204 in the cabinet 202 such that the base 132 abuts and is fixedly coupled with a bottom surface 206 of the cabinet 202. For purposes of brevity, the details of the features and functionality discussed with reference to FIG. 1 will not be fully repeated, and it should be understood that features and functionality of FIGS. 1 and 2 are fully interchangeable, combinable, and/or useable in the example systems described herein unless explicitly noted.

The multi-level storage container 102 may slideably extend through an opening 208 in the cabinet 202 on the slideable portion of the slides 130 until a stop 142 included on the multi-level storage container 102 contacts the cabinet 202. The stop 142 may be vertically adjustable with slots 144 to align with an interior surface 210 of the cabinet 202 so as to impede further movement of the multi-level storage container 102 out of the cabinet 202. When extended from the cabinet 202, a latch 146 coupled with the multi-level storage container 102 may secure the multi-level storage container 102 in a withdrawn position from the cabinet 202. When slid on the slides 130 into the cavity 204 in the cabinet 202, a cabinet door, or drawer front coupled with a front face 148 of the front vertical member 106 may be aligned with the opening 208 in the cabinet 202 using adjustable alignment brackets 144.

The shelf horizontal planar member 104B may be coupled with the structural base horizontal planar member 104A by a swivel 154. The swivel 154 is a mechanism or device that enables independent rotational movement of the shelf horizontal planar member 104B from a first position, such as a rest position of the swivel 154, where the shelf horizontal planar member 104B is in parallel alignment with the structural base horizontal planar member 104A to other second positions where the shelf horizontal planar member 104B is obliquely aligned (as illustrated in FIG. 1) or perpendicularly aligned (as illustrated in FIG. 2) with respect to the structural base horizontal planar member 104A. The shelf horizontal planar member 104B is coupled with the structural base horizontal planar member 104A by only the swivel 154. Accordingly, an axis of rotation of the swivel 154 and the shelf horizontal planar member 104B is on the planar surface of the structural base horizontal planar member 104A.

When the shelf horizontal planar member 104B is rotated out of the rest position, portions of the shelf horizontal planar member 104B extend beyond a width of the front and rear vertical member 106 and 108. Accordingly, if the multi-level storage container 102 is slide into the cabinet while the shelf horizontal planar member 104B is rotated out of the rest position, the shelf horizontal planar member 104B may contact the cabinet and impede further slidable movement of the multi-level storage container 102 into the cabinet. Such contact may cause damage to the cabinet and/or the multi-level storage container 102.

The latch 146 may lock the multi-level storage container 102 in an extended position where the multi-level storage container 102 is slide out of the cabinet 202, such that the shelf horizontal planar member 104B may rotate without contacting the cabinet 202. In other examples, the latch 146 may be omitted. In these examples, rotation of the shelf horizontal planar member 104B may be impeded by another configuration of an arrest mechanism when the multi-level storage container 102 is not sufficiently extended from the cabinet. In still other examples, there may be no constraints on the slidability of the multi-level storage container 102, or the rotation of the shelf horizontal planar member 104B except for contact of the shelf horizontal planar member 104B with the cabinet 202.

Figure 3:
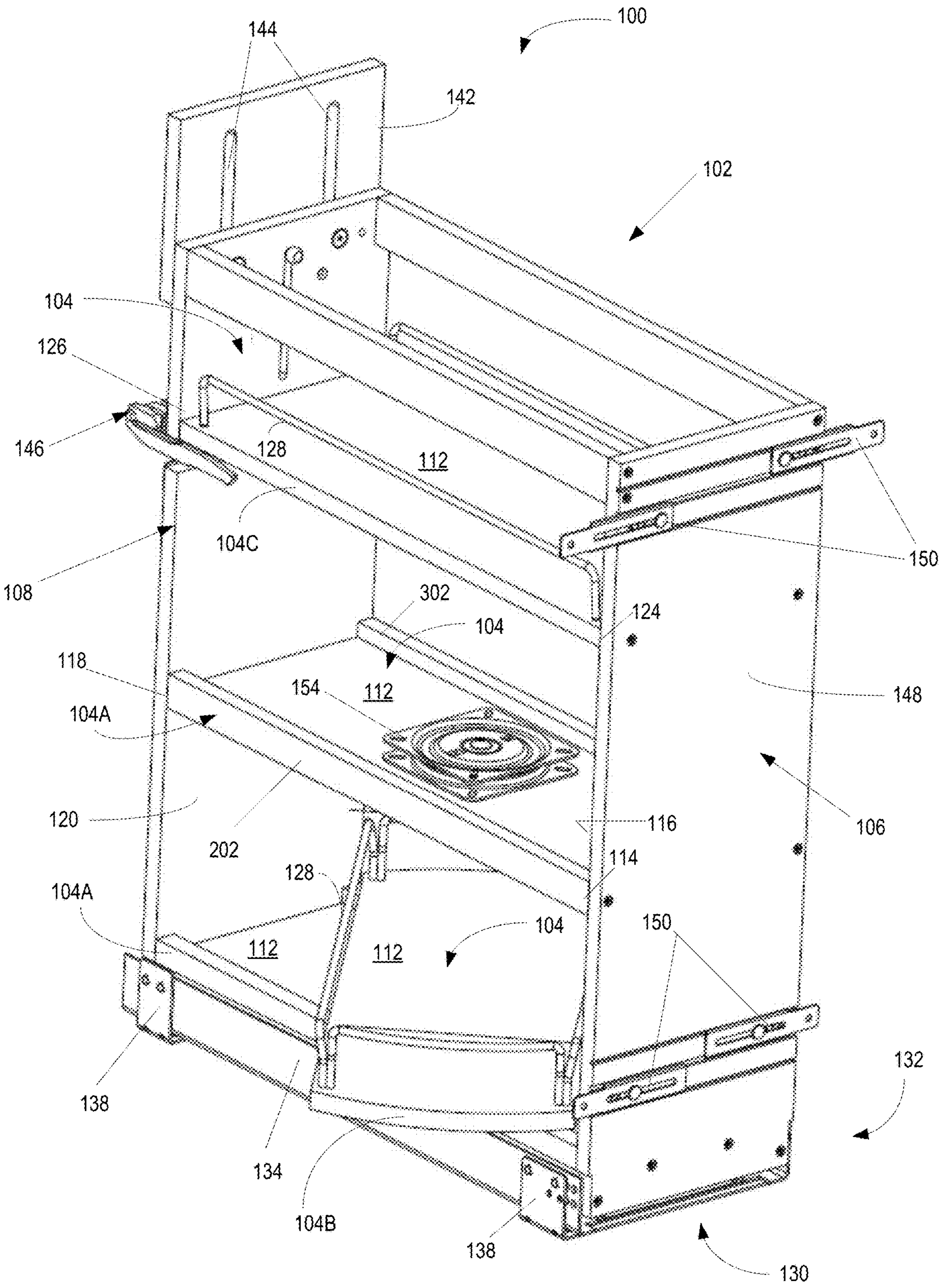
FIG. 3 is a perspective view of another example of the multi-level cabinet storage system.

FIG. 3 is a perspective view of another example of the multi-level storage system 100. In FIG. 3, a rotatable shelf horizontal planar member 104B in a middle position in the multi-level storage container 102 has been omitted for illustrative purposes of showing an example swivel 154. For purposes of brevity, the details of the features and functionality discussed with reference to FIGS. 1 and 2 will not be fully repeated, and it should be understood that features and functionality of FIGS. 1, 2 and 3 are fully interchangeable, combinable, and/or useable in the example systems described herein unless explicitly noted.

The structural base horizontal planar member 104A illustrated in FIG. 3 includes the horizontal planar surface 112 and struts 302. The horizontal planar surface 112 is separated by a predetermined thickness from an opposing horizontal planar surface of the structural base horizontal planar member 104A. The struts 302 may be fixedly coupled with a peripheral edge of the horizontal planar surface 112. In addition, the struts 302 may be fixedly coupled with the wall 116 of the front vertical member 106 and the wall 120 of the rear vertical member 108. The thickness of the struts 302 may be wider than the thickness of the opposing horizontal planar surfaces 112 such that the swivel 154 is positioned in a cavity between the structural base horizontal planar member 104A and the rotatable shelf horizontal planar member 104B. The struts 302 may also provide structural support for the multi-level storage container 102.

Figure 4A:
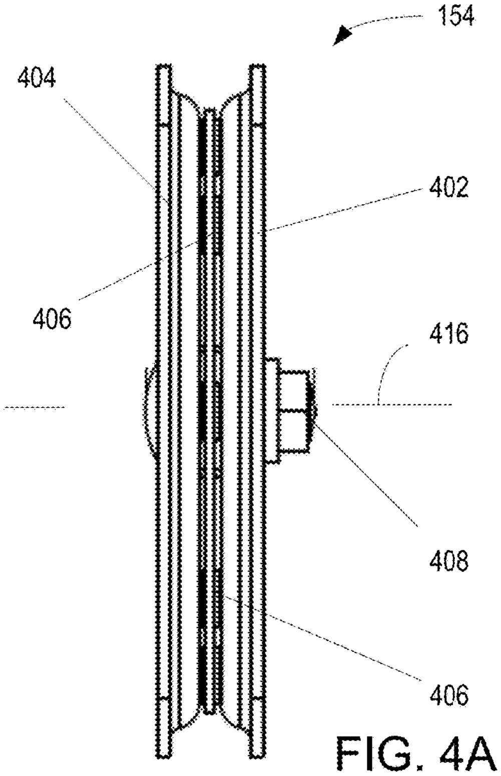
FIG. 4A is a side view of an example swivel that may be used in the multi-level cabinet storage system.
Figure 4B:
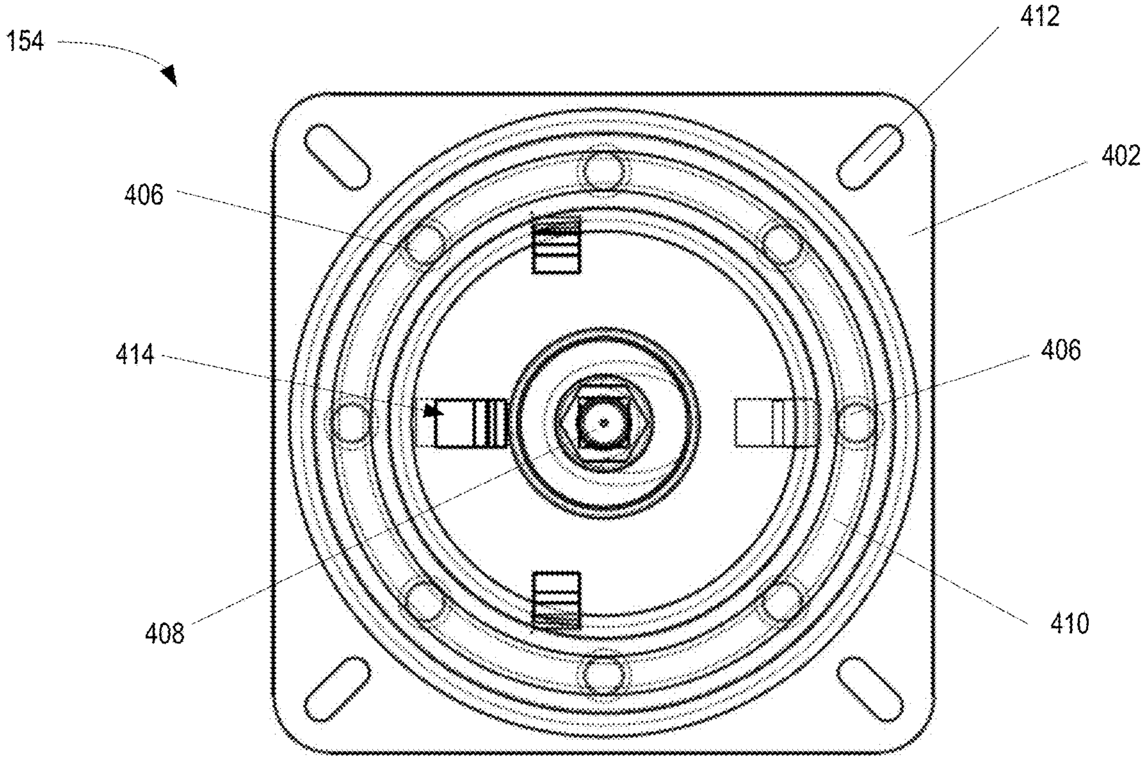
FIG. 4B is a cutaway plan view of the example swivel of FIG. 4A.

FIG. 4A is a side view, and FIG. 4B is a cutaway plan view of an example swivel 154. As illustrated in FIGS. 4A and 4B, the swivel 154 includes a base 402 for coupling with the planar surface 112 of the structural base horizontal planar member 104A, and a rotatable table 404 for coupling with the planar surface 112 of the rotatable shelf horizontal planar member 104B. The base 402 and the rotatable table 404 are position on opposing sides of the swivel 154, with rollers 406, such as ball bearings, held between the base 402 and the rotatable table 404 by a fastener 408, such as a nut and bolt arrangement with a locking nut or lock washer. The rollers 406 may be positioned in a race 410, or other form of keeper that allows the rotatable table 404 to rotate with respect to the base 402 as the rollers 406 move in the race 410. A portion of the fastener 408 may extend away from the base 402 into an aperture formed in the structural base horizontal planar member 104A. By recessing a portion of the base 402 into the aperture formed in the structural base horizontal planar member 104A, the spacing between the structural base horizontal planar member 104A and the rotatable shelf horizontal planar member 104B may be minimized. In addition, the swivel 154 may be aesthetically hidden from view between the structural base horizontal planar member 104A and the rotatable shelf horizontal planar member 104B.

As illustrated in FIG. 4B, the structural base horizontal planar member 104A includes adjustable apertures 412, such as the illustrated slots, to receive fasteners, such as screws, for fixedly coupling the swivel 154 with the structural base horizontal planar member 104A. Similarly, the rotatable table 404 may include adjustable apertures for coupling with the rotatable shelf horizontal planar member 104B, using fasteners, such as screws.

The swivel 154 may be biased to return to a rest position. Biasing may be accomplished by a biasing member 414 with memory, such as a torsion spring. The biasing member 414 may be positioned between the base 402 and the rotatable table 404, and coupled with both the base 402 and the rotatable table 404. Thus, when the rotatable table 404 rotates with respect to the base 402 around a central axis of rotation 416 that is common to the base 402 and the rotatable table 404, the biasing member 414 develops a bias to return the rotatable table 404 back to the rest position with respect to the base 402.

In an example, where the biasing member is a torsion spring, the torsion spring may be a helical torsion spring or a spiral wound torsion spring having a first end fixedly coupled with the base, and a second end fixedly coupled with the rotatable table 404. In another example, the biasing member 414 may include a torsion bar that deforms, or twists to produce a rotational force to return the rotatable table 404 to the rest position with respect to the base 402.

The rest position of the swivel 154 may be arranged to occur when the structural base horizontal planar member 104A and the rotatable shelf horizontal planar member 104B are aligned in parallel alignment extending longitudinally between the front vertical member 106 and the rear vertical member 108, as illustrated by the middle shelf in FIG. 2. The rest position biasing may be based on mechanical spring(s), a slope or radius of the race 410, detents in the race 410, or any other mechanism or technique that cause the rollers 406 to be rotationally biased to move toward, or be biased into not moving out of a rest position. In an example, the rest positioning bias may be arranged such that the further the rotatable shelf horizontal planar member 104B is rotated out of parallel alignment with the structural base horizontal planar member 104A the greater the resistive counter force against further rotatable movement away from parallel alignment with the structural base horizontal planar member 104A.

Figure 5A:
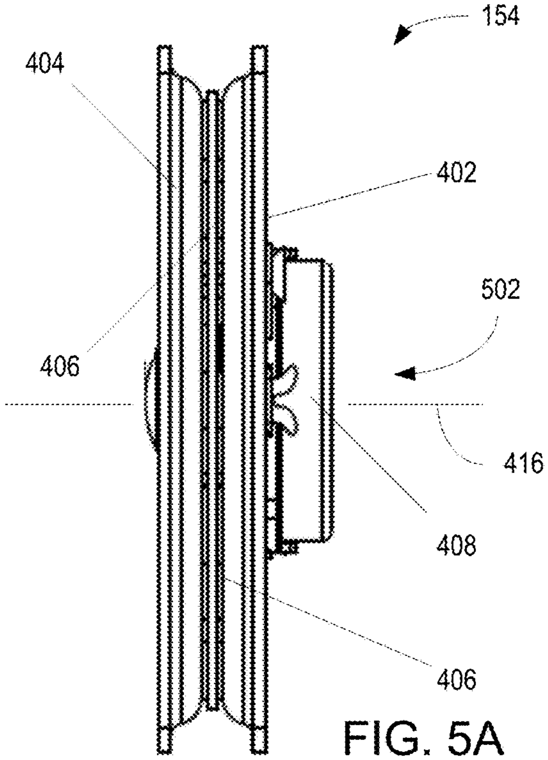
FIG. 5A is side view of another example swivel 154 that may be used in the multi-level cabinet storage system.

FIG. 5A is side view of another example swivel 154. In this example, the swivel 154 includes a rotary damper 502 on the base 402. For purposes of brevity, the details of the features and functionality discussed with reference to FIGS. 4A and 4B will not be fully repeated, and it should be understood that features and functionality of FIGS. 4A and 4B are fully interchangeable, combinable, and/or useable in the example systems described herein unless explicitly noted.

The rotary damper 502 may operate as a resistance to slow the rotatable travel of the rotatable shelf horizontal planar member 104B when the rotatable shelf horizontal planar member 104B is returning to, or being rotated out of the rest position. In this way, the inertial rotational acceleration of the rotatable shelf horizontal planar member 104B may be sufficiently suppressed such that items positioned on the rotatable shelf horizontal planar member 104B, such as jars or cans do not topple out when the rotatable shelf horizontal planar member 104B experiences strong rotational force produced by a user to rotate the rotatable shelf horizontal planar member 104B away from the rest position, and/or unimpeded rotation, such as rotation back to the home position, when a user releases the rotatable shelf horizontal planar member 104B while the rotatable shelf horizontal planar member 104B is positioned obliquely or perpendicular with respect to the structural base horizontal planar member 104A (such as the illustrated bottom rotatable shelf in FIG. 2). In other words, the rotary damper 502 may impede, or slow down the rotational bias of the structural base horizontal planar member 104A to return to the rest position or move away from the rest position.

Figure 5B:
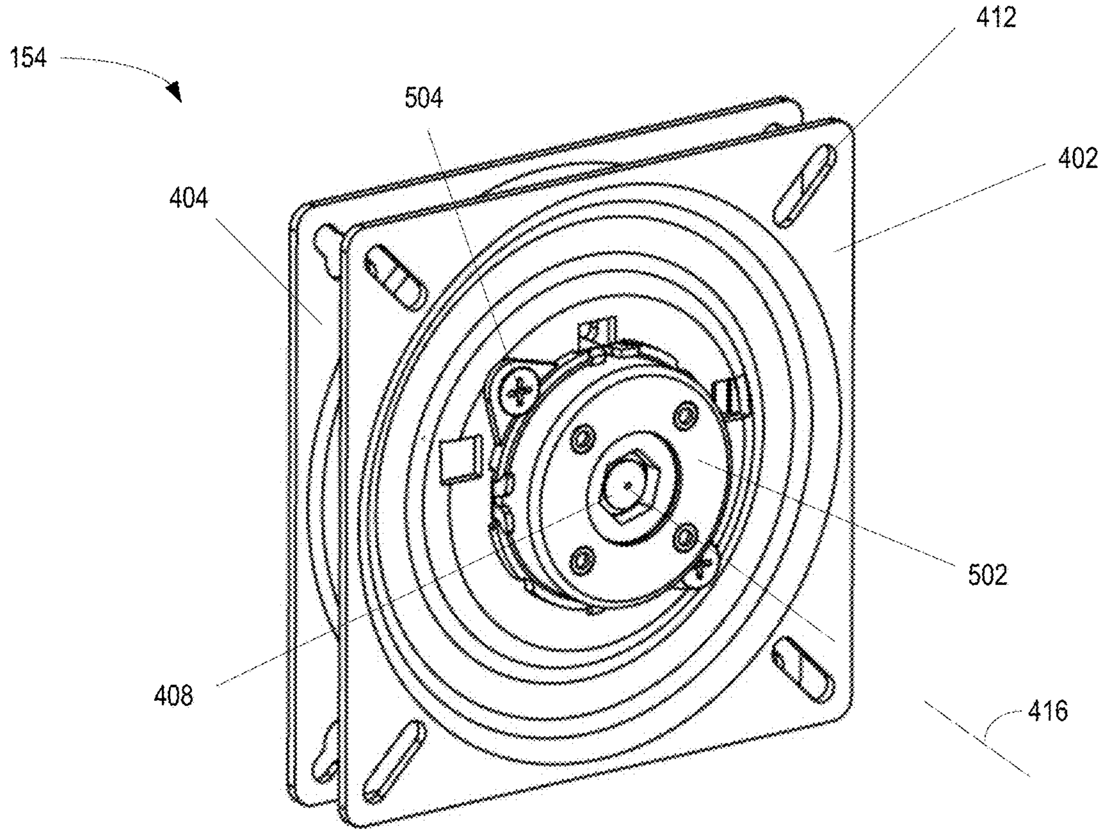
FIG. 5B is a perspective view of one side of an example swivel on which a rotary damper is mounted.
Figure 5C:
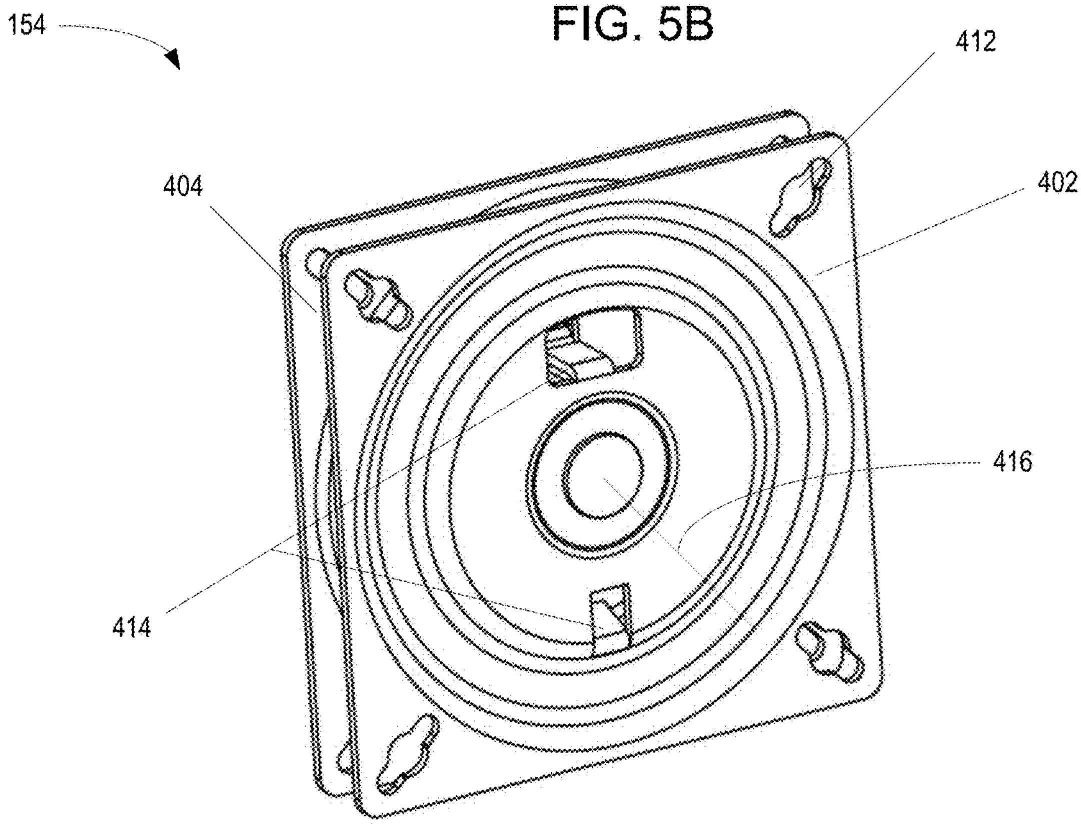
FIG. 5C is a perspective view of the opposite side of the example swivel illustrated in FIG. 5B.

FIG. 5B is a perspective view of one side of an example swivel 154 on which a rotary damper 502 is mounted by fasteners 504. FIG. 5C is a perspective view of the opposite side of the example swivel 154 illustrated in FIG. 5B. In FIG. 5C, the biasing member 414 is positioned between the base 402 and the rotatable table 404 and is illustrated as coupled with the base 402. the another side of an example swivel 154. on which a rotary damper 502 is mounted.

Figure 6:
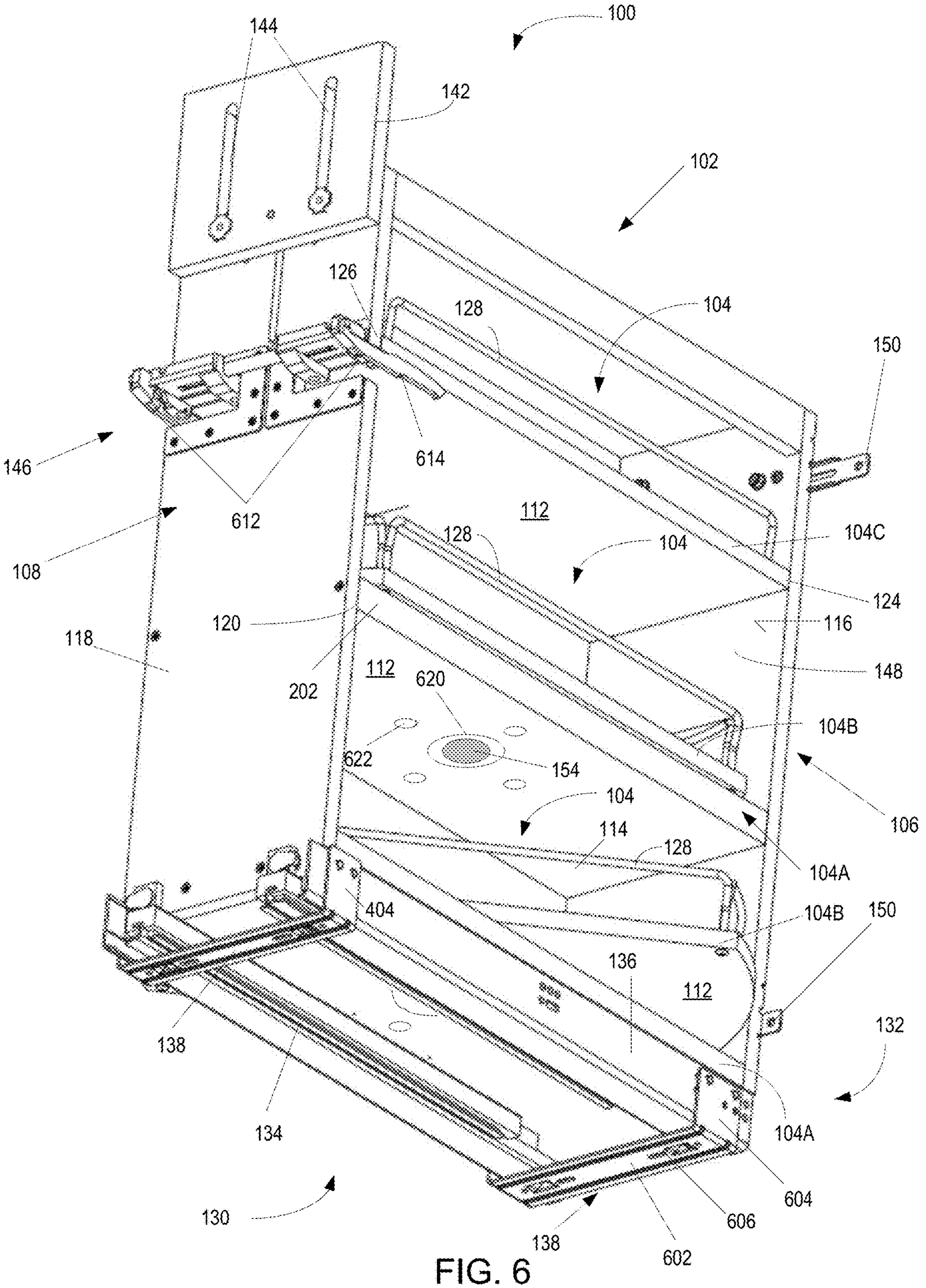
FIG. 6 is perspective rear view of the multi-level cabinet storage system of FIGS. 1 and 2.

FIG. 6 is perspective rear view of the multi-level storage system 100 of FIGS. 1 and 2. The multi-level storage system 100 includes the front and rear vertical members 106 and 108 and the horizontal planar members 104. For purposes of brevity, the details of the features and functionality discussed with reference to FIGS. 1-5 will not be fully repeated, and it should be understood that features and functionality of FIGS. 1-5 are fully interchangeable, combinable, and/or useable in the example systems described herein unless explicitly noted.

In FIG. 6, the first and second slides 134 and 136 are illustrated as extending from the front vertical member 106 beyond the rear vertical member 108 so that the multi-level storage container 102 may be fully extended from a cabinet in which the system 100 is mounted. The mounting bracket 138, which may be included with the slides 130, includes a horizontal member 602 arranged to abut a bottom surface of the cabinet, and vertically extending laterals 604 coupled with the first and second slides 134 and 136 and/or the vertical members and/or the structural base horizontal planar member 104A. The mounting bracket 138 may include apertures 606 to receive screws for fixedly coupling the slides 130 to the bottom surface of the cabinet. The first and second slides 134 and 136 may included a fixed portion coupled with the mounting bracket 138, and a slideable portion that slides away from the fixed portion when the multi-level storage container 102 is slid in a slide direction out of the cabinet.

The latch 146 may extend away from the rear vertical member 108 and may latchably secure the multi-level storage container 102 in a withdrawn position outside the cabinet. The latch 146 includes an spring loaded bolt 612 coupled with the rear vertical member 108, and a handle 614. The spring loaded bolt 612 may be engaged to curtail slideable movement of the multi-shelf storage container 102 when the multi-shelf storage container 102 is extended to be fully outside the cabinet. This will prevent accidental contact between the cabinet carcass and a rotatable shelf horizontal planar member 104B that is rotated out of parallel alignment with its respective horizontal planar member 104A.

The handle 614 may be accessible to a user to release the spring loaded bolt 612. The handle 614 may be positioned to extend horizontally between the front and rear vertical members 106 and 108, and be vertically positioned between two of the horizontal planar members 104. Once the rotatable shelf horizontal planar member 104B is rotated into parallel alignment with the structural base horizontal planar member 104A, a user may manually actuate the handle 414 to release the spring loaded bolt 612 in order to allow the multi-level storage container 102 to be slid back into the cabinet. In other examples, other forms of latches may be used.

For example, a fully or semi-automated latch 146 may automatically initiate to impede the slide travel of the multi-level storage container 102 according to a sensed rotatable position of the rotatable shelf horizontal planar member 104B. In other examples, a fully or semi-automated latch 146 may automatically latch when the multi-level storage container 102 extends far enough out of the cabinet to allow full rotational movement of the rotatable shelf horizontal planar member 104B. In any of these examples, disengagement of the latch 146 to allow slideable movement of the multi-level storage container 102 back into the cabinet may be manual, by a user actuating release with the handle 614, and/or automatically released based on a sensed position of the rotatable shelf horizontal planar member 104B.

As also illustrated in FIG. 6, the structural base horizontal planar member 104A includes a central aperture 620 sized to accommodate the swivel 154; either with, or without the rotary damper 502 being present. The structural base horizontal planar member 104A also includes fastener apertures 622 to receive fasteners coupling the base 402 of the swivel 154. The fastener apertures 622 may be threaded in order to threadedly engage a threaded fastener.

Figure 7:
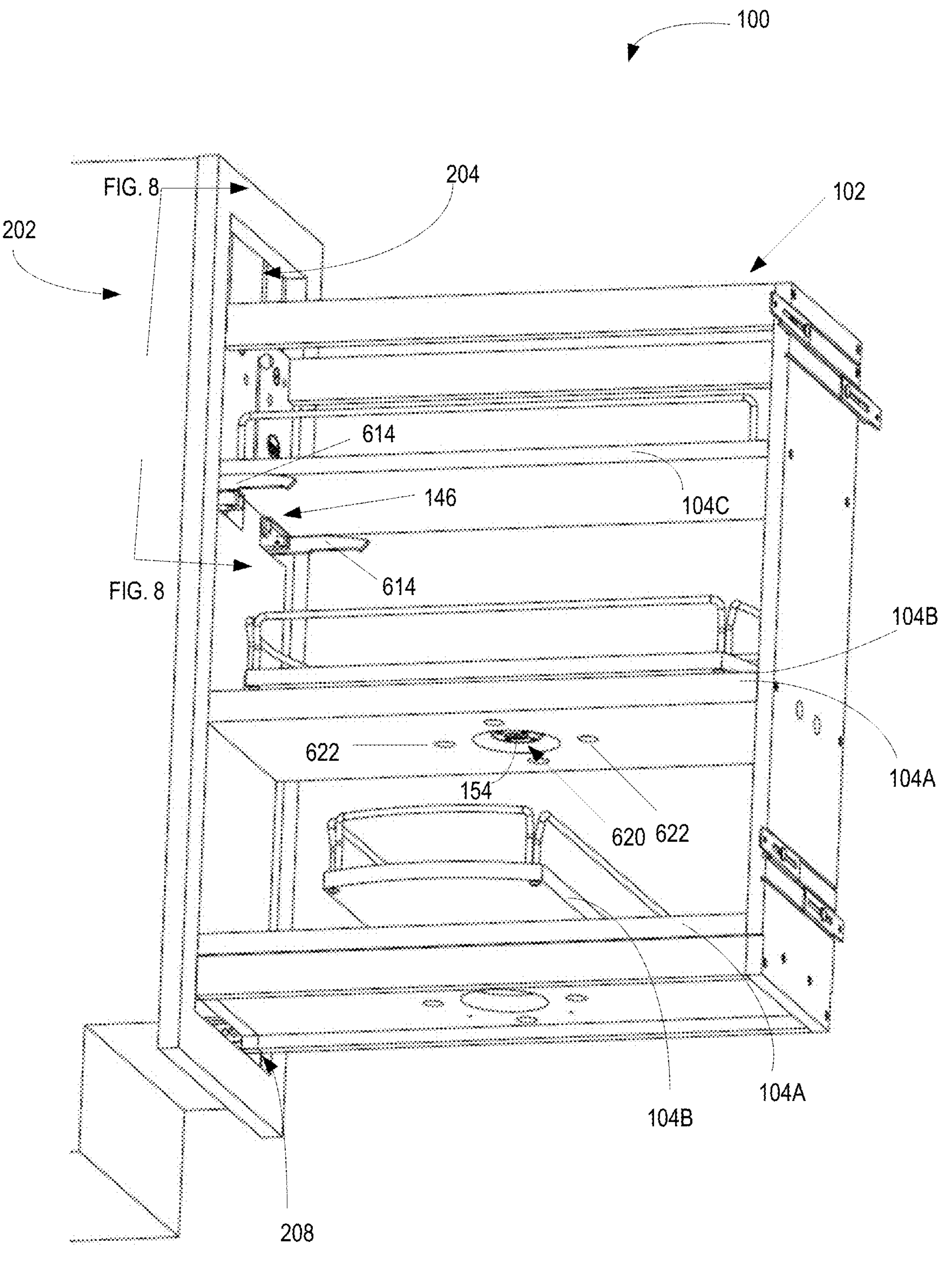
FIG. 7 illustrates a side view of an example of the multi-level storage container extended from a cabinet carcass.

FIG. 7 illustrates a side view of an example of the multi-level storage container 102 extended from a cabinet carcass 202. In this example, the bottom most rotatable shelf horizontal planar member 104B is rotated to be oblique, or substantially perpendicular, to the structural base horizontal planar member 104A. Accordingly, if the multi-level storage container 102 was moved on the slides 134 back into the cavity 204 of the cabinet 202 through the opening 208, the rotatable shelf horizontal planar member 104B would interfere with slide progress and prevent re-entry of the multi-level storage container 102 into the cavity 204. In other examples, other cabinet configurations may be used in which to mount and house the multi-level storage container 102.

As also illustrated in FIG. 7, the structural base horizontal planar member 104A includes the central aperture 702 to accommodate the swivel 154. As illustrated, the handle 614 of the latch 146 is a dual handle on a common shaft that extends horizontally out of the cabinet 202 on opposite sides underneath of the fixed shelf horizontal member 104C for ease of access by a user from either side of the multi-level storage container 102. The handles 614 become accessible from outside the cabinet 202 only when the multi-level storage container 102 is extended far enough out of the cabinet 202 for the latch 146 to engage and disable retraction of the multi-level storage container 102 into the cavity 204 of the cabinet 202.

Figure 8:
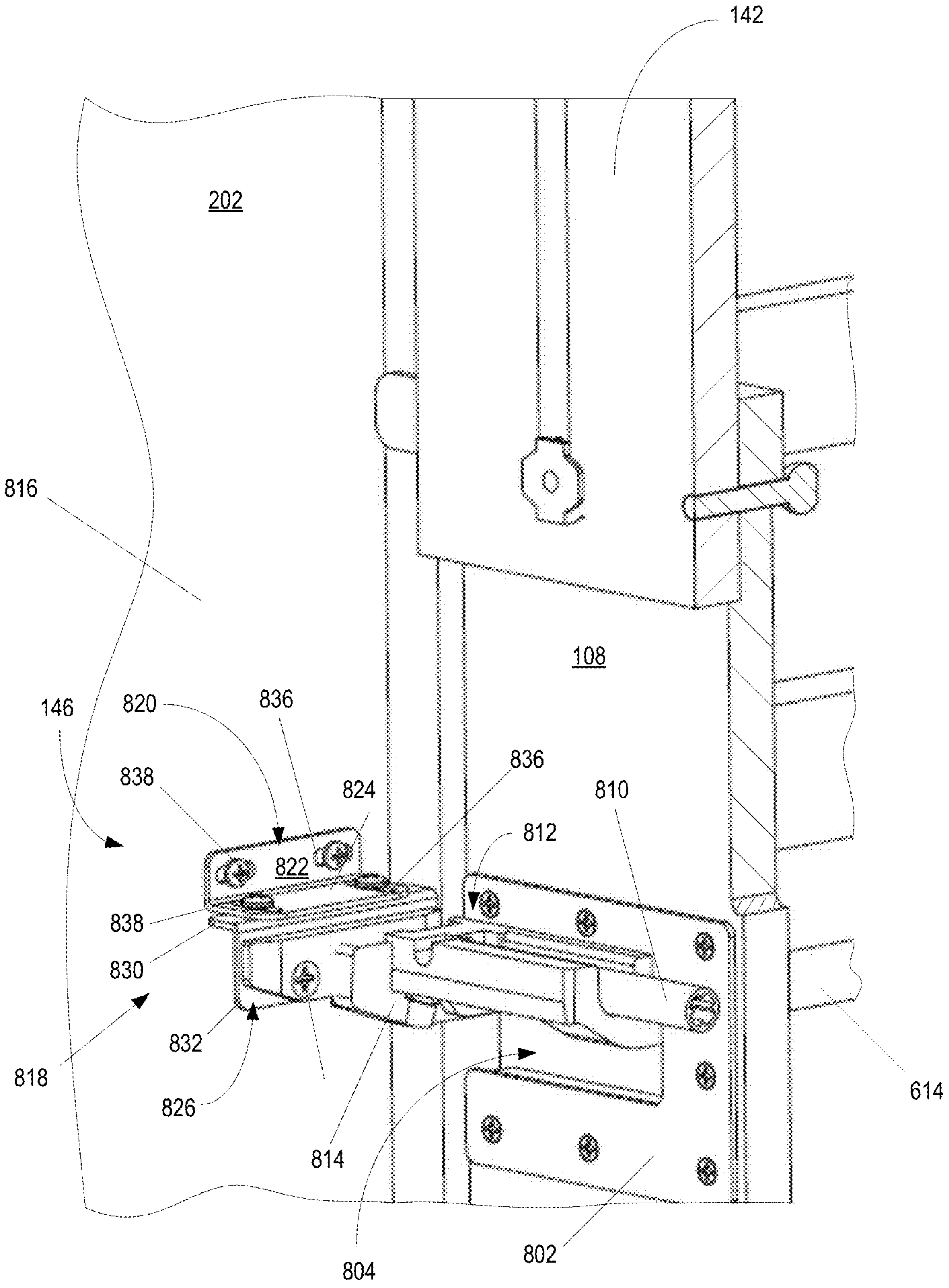
FIG. 8 is a cutaway partial view of the cavity of the cabinet carcass and the multi-level storage container of FIG. 7.

FIG. 8 is a cutaway partial view of the cavity of the cabinet carcass 202 and the multi-level storage container 102 of FIG. 7. In FIG. 8, the latch 146 is coupled with the rear vertical member 108 by a planar bracket 802 surrounding an aperture 804 in the rear vertical member 108. The planar bracket 802 may be fixedly coupled with the rear vertical member 108, such as by threaded fasteners to support and reinforce the rear vertical member 108. The single example "C" shaped planar bracket 802 and aperture 804 having an open end facing an inner wall of the cabinet 202 as illustrated in FIG. 8 are one example configuration. An alternative configuration in which there are multiple "C" shaped planar brackets on the rear vertical member 108 and apertures in the rear vertical member 108 is illustrated in FIG. 6. Other examples of planar brackets and apertures with similar functionality are also contemplated.

The latch 146 is coupled with the multi-shelf storage container 102 such that slideable movement of the multi-shelf storage container 102 is curtailed by the latch 146 in response to the multi-shelf storage container 102 being extended out of the cabinet 202 a predetermined distance. Where there are handles 614 of the latch 146 on opposite sides of the multi-level storage container 102 a connector shaft 810 may fixedly couple the handles 614 and provide a spring loaded bolt 612 that engages with a receiver 814 when the multi-level storage container 102 is fully slide out of the cavity 204 through the opening 208.

The receiver 814 is fixedly coupled with an interior wall 816 the cabinet carcass 202 by an adjustable bracket 818. The adjustable bracket 812 is illustrated as a two-piece adjustable bracket. The illustrated two-piece adjustable bracket 812 includes a first angled bracket 820 having perpendicularly intersecting flanges such that a first flange 822 abuts an inner surface of the cabinet carcass 202, and a second flange 824 contiguously aligns with a second angled bracket 826. Each of the first and second flanges 822 and 824 include slots 828 to provide for adjustable alignment of the receiver 814 with the bolt 812.

The second angled bracket 826 includes perpendicularly arranged first and second flanges 830 and 832 to respectively contiguously align with the second flange 824 of the first angled bracket 820, and also contiguously couple with the receiver 814. The first and second flanges 822 and 824 of the first angled bracket 820 include slots 836 sized to receive fasteners 838. The slots 836 in the first flange 822 allow horizontal adjustment of the receiver 814 on the inner wall of the cabinet 202, and the slots 836 in the second flange 824 allow adjustment of the spacing of the receiver 814 away from the inner wall of the cabinet 202. Thus, the first and second angled brackets 824 and 826 provide for alignment of the receiver 814 with the bolt 812, which is coupled to the multi-shelf storage container 102.

The first flange 830 of the second angled bracket 826 may include threaded apertures to receive fasteners 838 extending through the slots 836 of the second flange 824 of the first angled bracket 824. Accordingly, the second angled bracket 826 may be adjustably spaced away from the inner wall of the cabinet carcass 202 in order to align the receiver 814 with the bolt 812, while the flanges 824 and 830 of the first and second angled members 820 and 826 are contiguously aligned.

It is now apparent that there are many advantages of the multi-level cabinet storage system 100 provided herein. In addition to the advantages that have been described, it is also possible that there are still other advantages that are not currently recognized but which may become apparent at a later time.

While preferred embodiments of the multi-level cabinet storage system have been described, it should be understood that the disclosure is not limiting, and modifications may be made without departing from the features and functionality described. The scope of the disclosure is defined by the appended claims, and all devices that come within the meaning of the claims, either literally or by equivalence, are intended to embrace them.

What is claimed is:

1. A cabinet storage system comprising:

a multi-shelf storage container comprising a plurality of horizontal planar members positioned horizontally between, and perpendicular to, a front vertical planar member and a rear vertical planar member;

a plurality of slides coupled with the multi-shelf storage container, and configured to couple with a cabinet carcass in which the multi-shelf storage container is mountable;

at least two shelves;

a swivel coupled with one of the horizontal planar members and one of the at least two shelves so that the one of the at least two shelves rotates horizontally with respect to the one of the horizontal planar members; and a latch coupled with the multi-shelf storage container and extending away from the multi-shelf storage container to latchably secure the multi-shelf storage container in a position at least partly outside the cabinet carcass, wherein the latch comprises a spring loaded bolt and a handle, and wherein at least a portion of the spring loaded bolt is coupled with the rear vertical planar member, and the handle is accessible by a user from between the rear vertical planar member and the front vertical planar member and between two of the horizontal planar members.

2. The cabinet storage system of claim 1, wherein the one of the horizontal planar members and the at least one of the at least two shelves are positioned in parallel planes with the swivel positioned therebetween.

3. The cabinet storage system of claim 1, wherein the swivel includes a base coupled with the one of the horizontal planar members, and a rotatable table coupled with a planar surface of the at least one of the at least two shelves, the base and the rotatable table being on opposing sides of the swivel, and the rotatable table being rotatable with respect to the base.

4. The cabinet storage system of claim 3, wherein the one of the horizontal planar members includes an aperture sized to receive a portion of the base that extends into the aperture.

5. The cabinet storage system of claim 3, wherein the swivel includes a bias coupled between the base and the rotatable table to rotatably return the at least one of the at least two shelves to a rest position where the at least one of the at least two shelves is aligned in parallel with the horizontal planar members.

6. The cabinet storage system of claim 5, wherein the swivel includes a rotary damper coupled with the base to slow inertial rotational acceleration of the at least one of the at least two shelves in response to the at least one of the at least two shelves rotatably returning to, or being rotated out of the rest position.

7. The cabinet storage system of claim 1, wherein the one of the horizontal planar members is fixedly coupled with the front vertical planar member at a first end and fixedly coupled with a rear vertical planar member at a second end, the first end being opposite the second end, and the at least one of the at least two shelves is coupled only with the swivel.

8. The cabinet storage system of claim 7, wherein the at least one of the at least two shelves is not coupled with the front vertical planar member or the rear vertical planar member.

9. The cabinet storage system of claim 1, wherein the latch includes a receiver adjustably mountable in the cabinet carcass to receive the spring loaded bolt, the spring loaded bolt coupled with and actuated by the handle, and the receiver adjustably mountable in the cabinet carcass to engage the spring loaded bolt and secure the multi-shelf storage container in a position external to the cabinet carcass in response to the multi-shelf storage container being a predetermined distance outside the cabinet carcass.

10. A cabinet storage system comprising:

a plurality of planar horizontal members;

a front vertical member and a rear vertical member, at least some of the planar horizontal members coupled with the front vertical member and the rear vertical member and extending therebetween to form a multi-shelf storage container;

a slide coupled with the multi-shelf storage container, the multi-shelf storage container slideable out of a cabinet carcass in which the multi-shelf storage container is mounted;

a swivel comprising a base and a rotatable table, the base fixedly coupled with a planar surface of one of the planar horizontal members; and a horizontal shelf fixedly coupled with the rotatable table in a plane parallel with the one of the planar horizontal members; and a latch coupled with the multi-shelf storage container, wherein slideable movement of the multi-shelf storage container is curtailed by the latch in response to the multi-shelf storage container being extended out of the cabinet carcass, the latch adjustably coupled with an interior wall of the cabinet carcass by a two-piece adjustable bracket.

11. The cabinet storage system of claim 10, wherein the horizontal shelf is aligned in parallel alignment with the one of the planar horizontal members in a rest position of the swivel, and the horizontal shelf is aligned obliquely or perpendicularly with respect to the one of the planar horizontal members in other than the rest position.

12. The cabinet storage system of claim 10, wherein an axis of rotation of the swivel and the horizontal shelf is on a planar surface of the one of the planar horizontal members.

13. The cabinet storage system of claim 10, wherein the horizontal shelf is only rotatable without contact with the cabinet carcass when the multi-shelf storage container is slideably extended out of the cabinet carcass.

14. The cabinet storage system of claim 10, wherein the multi-shelf storage container is slideable with the slide out of the cabinet carcass in a slide direction, and the plurality of planar horizontal members extend between the front vertical member and the rear vertical member in the slide direction.

15. The cabinet storage system of claim 10, wherein the two-piece adjustable bracket comprises a first angled member having a flange with slots, and a second angled member having a flange with threaded apertures to receive fasteners extending through the slots such that the flanges of the first and second angled members are contiguously aligned.

16. A cabinet storage system comprising:

a multi-shelf storage container comprising a plurality of horizontal planar members positioned horizontally between, and perpendicular to, a front vertical planar member and a rear vertical planar member;

a plurality of slides coupled with the multi-shelf storage container, and configured to couple with a cabinet carcass in which the multi-shelf storage container is mountable;

at least two shelves;

a swivel coupled with one of the horizontal planar members and one of the at least two shelves so that the one of the at least two shelves rotates horizontally with respect to the one of the horizontal planar members; and a latch coupled with the multi-shelf storage container and extending away from the multi-shelf storage container to latchably secure the multi-shelf storage container in a position at least partly outside the cabinet carcass, wherein the latch comprises a spring loaded bolt and a handle, and wherein the latch includes a receiver adjustably mountable in the cabinet carcass to receive the spring loaded bolt, the spring loaded bolt coupled with and actuated by the handle, and the receiver adjustably mountable in the cabinet carcass to engage the spring loaded bolt and secure the multi-shelf storage container in a position external to the cabinet carcass in response to the multi-shelf storage container being a predetermined distance outside the cabinet carcass.

17. The cabinet storage system of claim 16, wherein the one of the horizontal planar members and the at least one of the at least two shelves are positioned in parallel planes with the swivel positioned therebetween.

18. The cabinet storage system of claim 16, wherein the swivel includes a base coupled with the one of the horizontal planar members, and a rotatable table coupled with a planar surface of the at least one of the at least two shelves, the base and the rotatable table being on opposing sides of the swivel, and the rotatable table being rotatable with respect to the base.

19. The cabinet storage system of claim 18, wherein the swivel includes a bias coupled between the base and the rotatable table to rotatably return the at least one of the at least two shelves to a rest position where the at least one of the at least two shelves is aligned in parallel with the horizontal planar members.

20. The cabinet storage system of claim 16, wherein the one of the horizontal planar members is fixedly coupled with the front vertical planar member at a first end and fixedly coupled with a rear vertical planar member at a second end, the first end being opposite the second end, and the at least one of the at least two shelves is coupled only with the swivel.

* * * * *